United States Patent
Komeno et al.

(10) Patent No.: US 7,580,104 B2
(45) Date of Patent: Aug. 25, 2009

(54) LIQUID CRYSTAL DISPLAY DEVICE

(75) Inventors: Hitoshi Komeno, Mobara (JP); Toshiyuki Koshita, Chosei (JP)

(73) Assignee: Hitachi Displays, Ltd, Chiba (JP)

( * ) Notice: Subject to any disclaimer, the term of this patent is extended or adjusted under 35 U.S.C. 154(b) by 157 days.

(21) Appl. No.: 11/984,376

(22) Filed: Nov. 16, 2007

(65) Prior Publication Data
US 2008/0137022 A1 Jun. 12, 2008

(30) Foreign Application Priority Data
Dec. 6, 2006 (JP) ............................. 2006-328939

(51) Int. Cl.
G02F 1/1339 (2006.01)
G02F 1/1337 (2006.01)

(52) U.S. Cl. .................. 349/153; 349/156; 349/123

(58) Field of Classification Search ................. 349/122, 349/123, 149, 153, 155, 156
See application file for complete search history.

(56) References Cited

U.S. PATENT DOCUMENTS 7,088,418 B1 8/2006 Yamashita et al.

2006/0152663 A1* 7/2006 Kamoshida et al. ......... 349/149
2009/0147202 A1* 6/2009 Ashizawa et al. ........... 349/139

FOREIGN PATENT DOCUMENTS

| JP | 11-38424 | 7/1997 |
| JP | 2001-51282 | 8/1999 |
| JP | 2001-330837 | 5/2000 |

* cited by examiner

*Primary Examiner*—David Nelms
*Assistant Examiner*—David Y Chung
(74) *Attorney, Agent, or Firm*—Stites & Harbison PLLC; Juan Carlos A. Marquez, Esq.

(57) ABSTRACT

The present invention provides a liquid crystal display device with a narrow picture frame which reduces a sealing defect by suppressing spreading of an orientation film. In a region inside a sealing material and outside a display region, an uneven surface for suppressing spreading of the orientation film is formed. It is preferable that the uneven surface is formed using an insulation film and, at the same time, an etching stopper layer is formed below the insulation film which forms the uneven surface. It is more preferable that the uneven surface and the stopper layer are simultaneously formed with a layer used for forming pixels in a step for forming such a layer thus preventing the increase of manufacturing steps.

16 Claims, 12 Drawing Sheets

LIQUID CRYSTAL DISPLAY DEVICE

The present application claims priority from Japanese application JP2006-328939 filed on Dec. 6, 2006, the content of which is hereby incorporated by reference into this application.

BACKGROUND OF THE INVENTION

1. Field of the Invention

The present invention relates to a liquid crystal display device, and more particularly to a technique which is effectively applicable to a liquid crystal display device with a narrow picture frame region.

2. Description of the Related Art

A liquid crystal display device has been used as display devices of various sizes used in applications ranging from a miniaturized mobile phone to a large-sized television receiver set.

Figure 16:
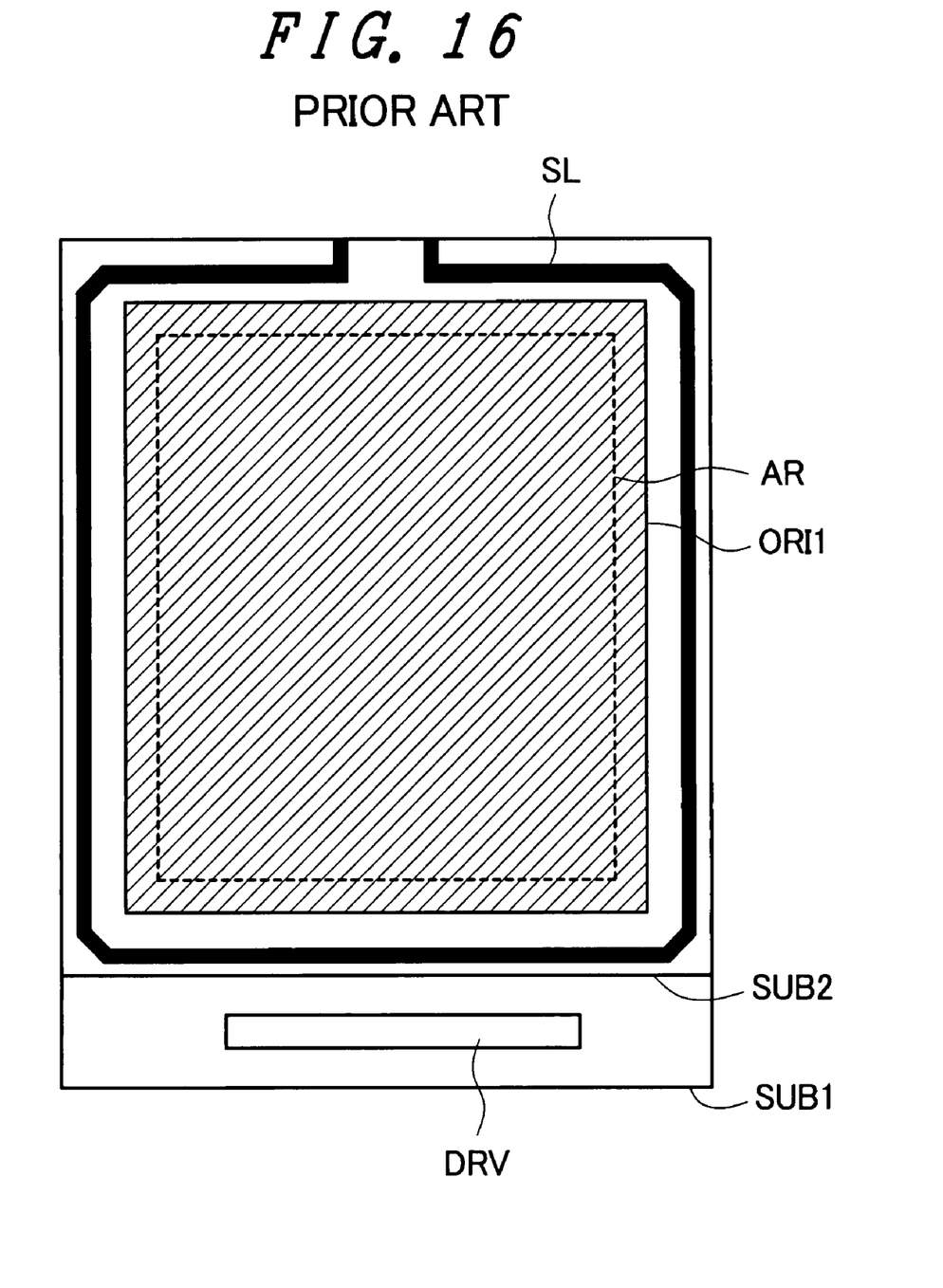
FIG. 16 is a plan view for explaining a conventional liquid crystal display device.

FIG. 16 is a plan view for explaining a conventional liquid crystal display device. Here, a miniaturized liquid crystal display device is illustrated as one example. In the liquid crystal display device, a substrate SUB1 and a counter substrate SUB2 are adhered to each other using a sealing material SL, and liquid crystal is sandwiched between the substrate SUB1 and the counter substrate SUB2. An end portion of a side of the counter substrate SUB2 on a lower side of the drawing retracts from an end portion of a side of the substrate SUB1 on the lower side of the drawing, and a drive circuit DRV is mounted on the substrate SUB1 exposed by such retraction of the end portion. On a surface of the substrate SUB1 which is brought into contact with the liquid crystal, an orientation film ORI1 is formed by coating in a state that at least a display region AR is covered with the orientation film ORI1. In the same manner, on a surface of a counter substrate SUB2 which is brought into contact with the liquid crystal, an orientation film ORI2 not shown in the drawing is formed by coating in a state that at least the display region AR is covered with the orientation film ORI2.

Here, as a method for sealing liquid crystal, as shown in FIG. 16, there has been known a method in which a liquid crystal filling port is formed in a portion of the sealing material SL, the liquid crystal is filled in a space defined by the substrate SUB1, the counter substrate SUB2 and the sealing material SL through the liquid crystal filling port, and the liquid crystal filling port is sealed with a sealing material. As a method other than the above-mentioned method, there has been known a liquid crystal dropping sealing method in which, as described in patent document 1 (JP-A-11-38424) and patent document 2 (JP-A-2001-51282), for example, a sealing material SL is formed in an approximately closed rectangular shape without forming a liquid crystal filling port in the sealing material SL and, after dropping liquid crystal, a substrate SUB1 and a counter substrate SUB2 are adhered to each other to seal the liquid crystal. In this liquid crystal dropping sealing method, at the time of adhering the substrate SUB1 and the counter substrate SUB2, the liquid crystal spreads toward the sealing material SL and hence, in patent document 1 and patent document 2, for example, there is described a technique which forms a wall member in a region outside a display region AR and inside the surrounding sealing material SL thus suppressing spreading of the dropped liquid crystal.

Further, with respect to the sealing material SL, for example, patent document 3 (JP-A-2001-330837) describes a technique which forms an uneven surface on a portion which overlaps a sealing material SL for suppressing spreading of the sealing material SL when a substrate SUB1 and a counter substrate SUB2 are adhered to each other.

SUMMARY OF THE INVENTION

Usually, the sealing material SL is formed after a step for forming orientation films by coating. However, the adhesiveness between the sealing material SL and the orientation film ORI1 is not so high. According, as shown in FIG. 16, it is desirable that the orientation film ORI1 and the sealing material SL do not overlap each other.

However, since the orientation film ORI1 is formed by coating, there arises a drawback that the orientation film ORI1 spreads to the outside of the display region AR. Here, when a region from an end portion of the substrate SUB1 to the display region AR, that is, a width of a region outside the display region AR (so-called picture frame region) is large, there arises no problem. However, along with narrowing of the width of the picture frame region, the orientation film ORI1 spreads and extends to a region where the sealing material SL is formed thus giving rise to a drawback that sealing becomes defective.

Such a drawback becomes conspicuous in a miniaturized liquid crystal display device having a narrow picture frame region, particularly, in a liquid crystal display device in which a shortest distance from an end portion of the substrate SUB1 to the display region AR is 2.0 mm or less.

Here, drawbacks other than the above-mentioned drawbacks will become apparent from the description of the whole specification or drawings of the present application.

According to a liquid crystal display device of the present invention, an uneven surface which suppresses spreading of an orientation film is formed in a region inside a surrounding sealing material and outside a display region. Here, it is preferable that the uneven surface is constituted of an insulation film and, at the same time, an etching stopper layer is formed below the insulation film which forms the uneven surface. It is further preferable to form the uneven surface and the stopper layer simultaneously with a layer used for forming pixels in a step for forming such a layer. In this case, the increase of manufacturing steps can be prevented.

The present invention may be configured as follows, for example.

(1) The present invention is directed to a liquid crystal display device including a first substrate, a second substrate which is arranged to face the first substrate in an opposed manner, a sealing material which adheres the first substrate and the second substrate to each other, and liquid crystal which is sandwiched between the first substrate and the second substrate, wherein the first substrate includes pixel electrodes which are formed inside a display region, an orientation film which is formed at a position where the orientation film is brought into contact with the liquid crystal, a plurality of projections which is formed of a first insulation film below the orientation film in a region inside the sealing material and outside the display region, a second insulation film which is arranged at a position where the second insulation film overlaps the plurality of projections and below the first insulation film, and is formed of a material to be etched by an etching gas which forms the first insulation film into the plurality of projections, and a first stopper layer which is formed at a position where the first stopper layer overlaps the plurality of projections and between the first insulation film and the second insulation film, the first stopper layer being formed of a material which possesses etching selection property for the etching gas and protecting the second insulation film from the etching gas, and assuming a width of the sealing material as W1 and an overlapping width of the orientation film and the sealing material as W2, a relationship $W2 \leqq W1/2$ is established.

(2) In the constitution (1), it is desirable that a shortest distance from an end portion of the first substrate to the display region is 2.0 mm or less.

(3) In the constitution (1) or (2), it is desirable that the overlapping width W2 of the orientation film and the sealing material is set to W2=0.

(4) In any one of the constitutions (1) to (3), it is desirable that the first substrate includes lines which are arranged inside the display region, and lead lines which are arranged outside the display region and supply signals to the lines, and the lead lines are arranged below the second insulation film and overlap the first stopper layer.

(5) In the constitution (4), it is desirable that the first stopper layer is formed of a conductive film.

(6) In any one of the constitutions (1) to (5), it is desirable that the first substrate reflects a surface unevenness formed by the plurality of projections, and includes a second stopper layer which is formed at a position where the second stopper layer covers the plurality of projections and is formed of a material having a contact angle with the orientation film larger than a contact angle of the first insulation film with the orientation film.

(7) In the constitution (6), it is desirable that the second stopper layer is formed of the same material as the pixel electrodes, and is formed on the same layer as the pixel electrodes.

(8) In any one of the constitutions (1) to (7), it is desirable that the first substrate includes a counter electrode which is formed of a transparent conductive film inside the display region, and the liquid crystal is driven by an electric field which is generated between the pixel electrodes and the counter electrode.

(9) In the constitution (8), it is desirable that the first stopper layer is formed of the same material as the counter electrode, and is formed on the same layer as the counter electrode.

(10) In any one of the constitutions (1) to (7), it is desirable that the second substrate includes a counter electrode which is formed of a transparent conductive film inside the display region, and the liquid crystal is driven by an electric field which is generated between the pixel electrodes and the counter electrode.

(11) In the constitution (10), it is desirable that the first substrate includes an electrode which is formed of a transparent conductive film and is arranged below the pixel electrodes and at a position where the electrode overlaps the pixel electrodes, and a holding capacitance is formed between the electrode formed of the transparent conductive film and the pixel electrodes.

(12) In the constitution (11), it is desirable that the first stopper layer is formed of the same material as the electrode formed of the transparent conductive film and is formed on the same layer as the electrode formed of the transparent conductive film.

(13) In any one of the constitutions (1) to (12), it is desirable that the first insulation film and the second insulation film are formed of an inorganic insulation film.

(14) In any one of the constitutions (1) to (13), it is desirable that the first insulation film and the second insulation film are formed of a silicon nitride film.

(15) In any one of the constitutions (1) to (14), it is desirable that the first stopper layer is formed of a transparent conductive film.

(16) In any one of the constitutions (1) to (15), it is desirable that the plurality of projections is formed in a state that the projections surround four sides of the display region.

Here, the above-mentioned constitutions are exemplified only as one example, and various modifications can be made without departing from the technical concept of the present invention when necessary. Further, examples of the constitutions of the present invention other than the above-mentioned constitutions will become apparent from the description of the whole specification or drawings.

Typical advantageous effects obtained by the present invention are as follows.

According to the present invention, it is possible to provide a liquid crystal display device having a narrow picture frame which can reduce a sealing defect by suppressing spreading of an orientation film.

Other advantageous effect of the present invention will become apparent from the whole specification.

DESCRIPTION OF THE PREFERRED EMBODIMENTS

Embodiments of the present invention are explained in conjunction with drawings. Here, in all drawings and all embodiments, identical or similar constitutional elements are given same symbols, and their explanation is omitted.

Embodiment 1

Figure 1:
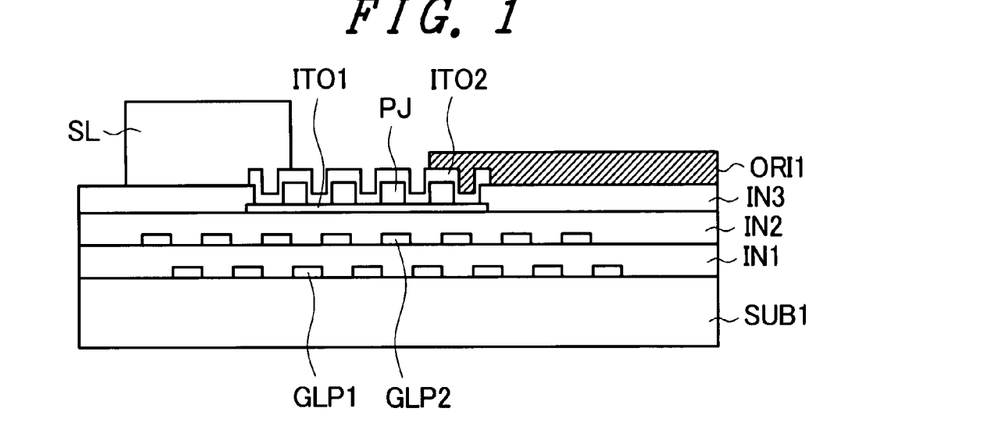
FIG. 1 is a view for explaining a liquid crystal display device of an embodiment 1 according to the present invention, and also is a cross-sectional view taken along a line A-A in FIG. 2.
Figure 2:
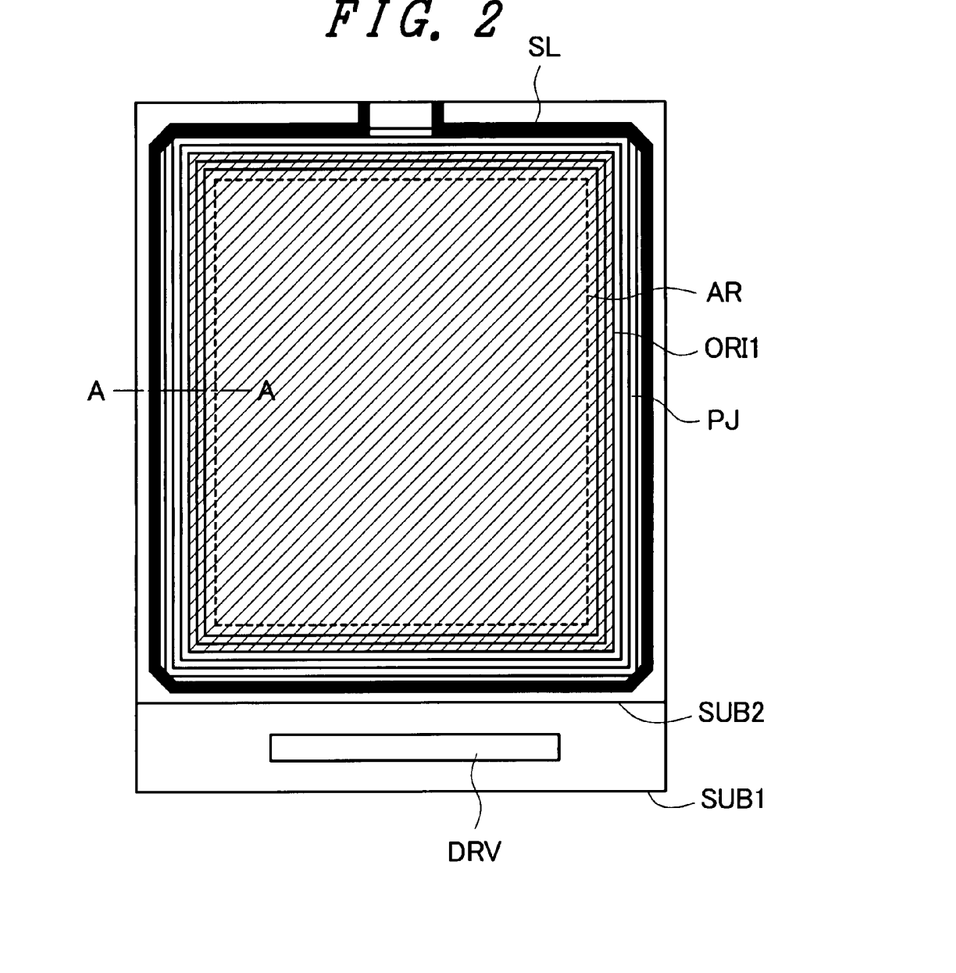
FIG. 2 is a plan view for explaining the liquid crystal display device of the embodiment 1 according to the present invention.
Figure 3:
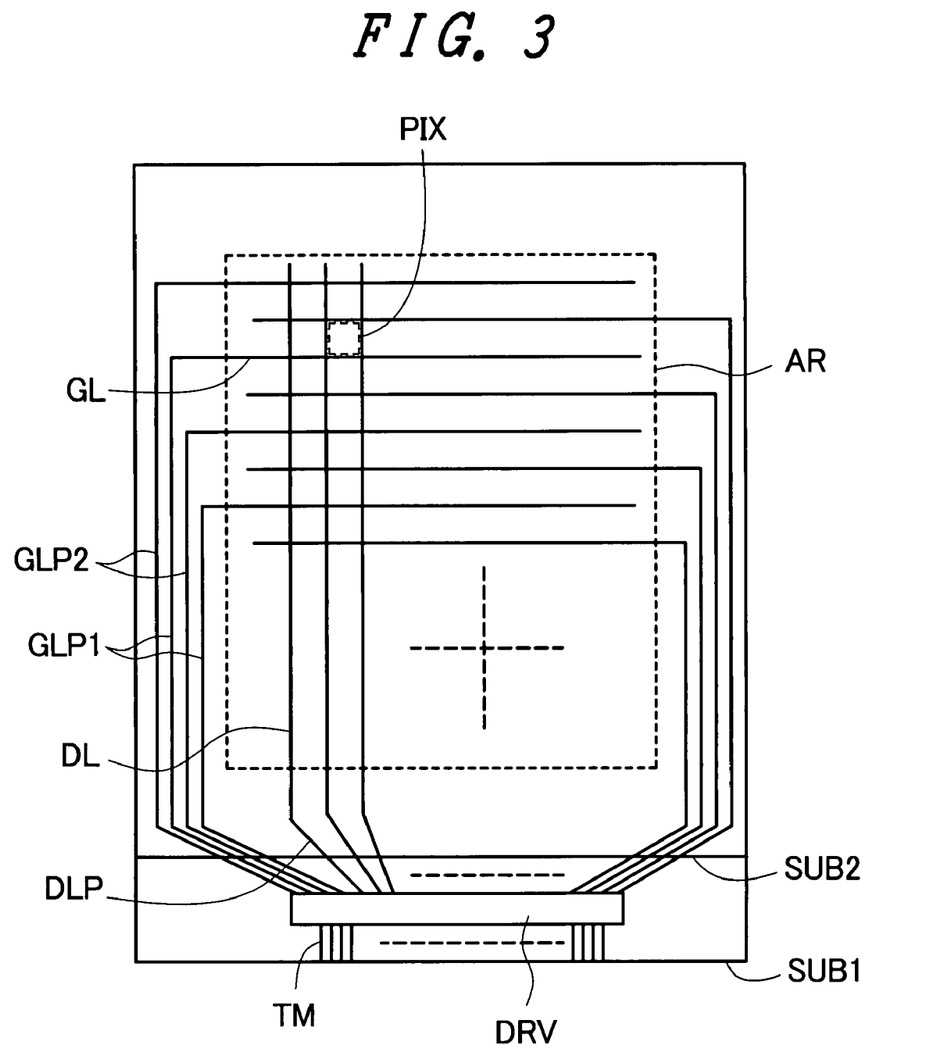
FIG. 3 is a plan view for explaining one example of a layout of wiring of the embodiment 1 according to the present invention.
Figure 4:
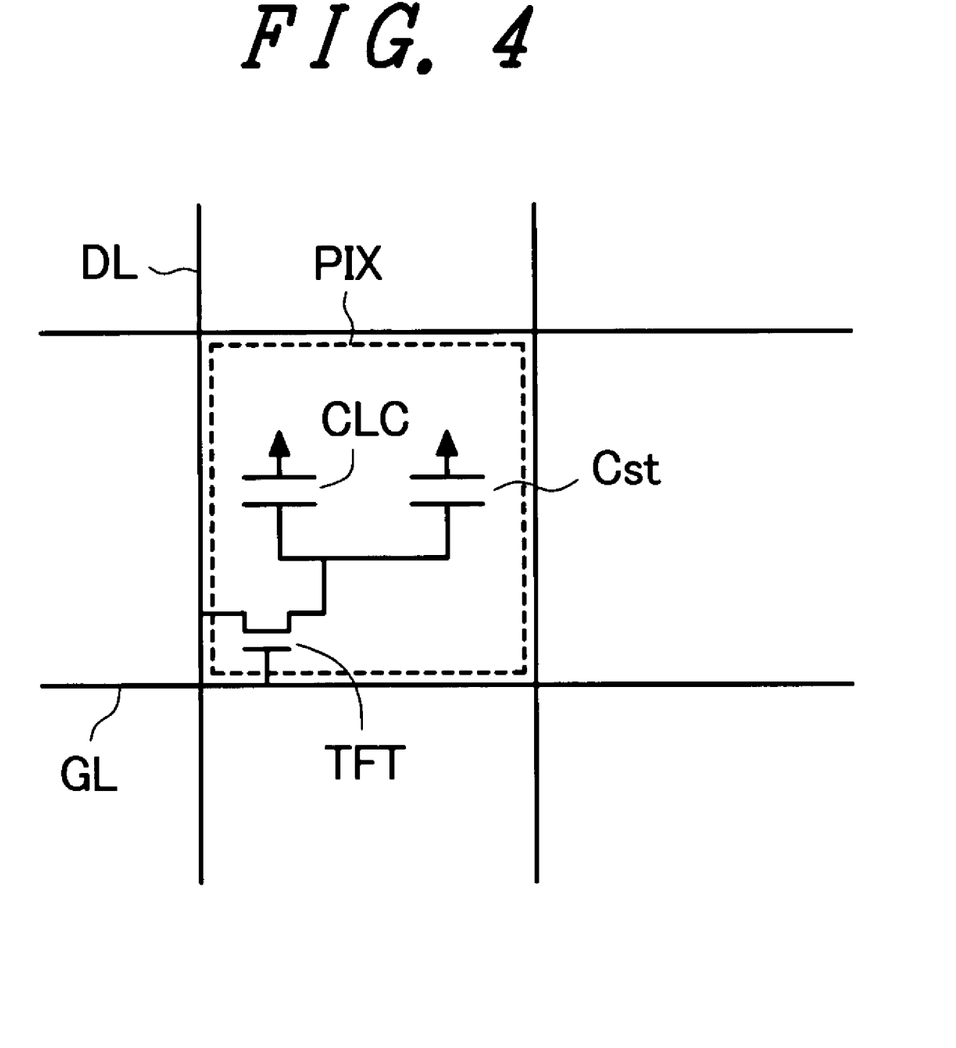
FIG. 4 is a plan view for explaining an equivalent circuit of a pixel.

FIG. 1 is a view for explaining a liquid crystal display device of an embodiment 1 according to the present invention, and also is a cross-sectional view taken along a line A-A in FIG. 2. FIG. 2 is a plan view for explaining the liquid crystal display device of the embodiment 1 according to the present invention. FIG. 3 is a plan view for explaining one example of a layout of wiring of the embodiment 1 according to the present invention. FIG. 4 is a plan view for explaining an equivalent circuit of a pixel.

As shown in FIG. 2, the liquid crystal display device of this embodiment is configured such that liquid crystal LC not shown in the drawing is sandwiched between a transparent insulating substrate (first substrate) SUB1 made of glass or the like and a transparent insulating counter substrate (second substrate) SUB2 made of glass or the like. Here, the substrate SUB1 and the counter substrate SUB2 are adhered to each other using a sealing material SL. The liquid crystal LC is filled in a space defined by the substrate SUB1, the counter substrate SUB2 and the sealing material SL through a liquid crystal filling port formed in the sealing material SL. Then, the liquid crystal filling port is sealed with a sealing material. Here, the present invention is not limited to such a constitution and may manufacture the liquid crystal display device using a liquid crystal dropping sealing method which uses a closed sealing material SL having no liquid crystal filling port.

An end portion of a side of the counter substrate SUB2 on a lower side of FIG. 2 retracts from an end portion of a side of the substrate SUB1 on the lower side of FIG. 2, and a drive circuit DRV is mounted on the substrate SUB1 exposed by such retraction of the end portion. On a surface of the substrate SUB1 which is brought into contact with the liquid crystal, an orientation film ORI1 is formed by coating in a state that the orientation film ORI1 covers at least a display region AR. In the same manner, on a surface of the counter substrate SUB2 which is brought, into contact with the liquid crystal, an orientation film ORI2 not shown in the drawing is formed by coating in a state that the orientation film ORI2 covers at least the display region AR.

As shown in FIG. 3 and FIG. 4, the liquid crystal display device of this embodiment is an active-matrix-type liquid crystal display device, wherein a plurality of pixels is arranged in a matrix array. The substrate SUB1 includes a plurality of scanning signal lines GL and a plurality of video signal lines DL which intersect the plurality of scanning signal lines GL. In the vicinity of the respective intersecting portions, thin film transistors TFT are formed as switching elements of the pixels. FIG. 4 shows an equivalent circuit of a pixel region PIX corresponding to one pixel out of the plurality of pixels arranged in a matrix array. A gate of the thin film transistor TFT is connected to one of the scanning signal lines GL to which a scanning signal is applied. One electrode (drain electrode SD1 not shown in the drawing) of the thin film transistor TFT is connected to one of video signal lines DL to which a video signal is applied. A pixel electrode PX not shown in the drawing is connected to another electrode (source electrode SD2 not shown in the drawing) of the thin film transistor TFT, and video signal is applied to another electrode via the thin film transistor TFT. Here, although there may be a case in which the electrode which is connected to the video signal line DL is referred to as the source electrode, for avoiding the confusion, the explanation is made by unifying the above-mentioned naming in this specification.

The pixel electrode PX generates a liquid crystal capacitance CLC between the pixel electrode PX and the counter electrode CT not shown in the drawing via the liquid crystal LC. Here, a display is performed by driving the liquid crystal LC with an electric field generated between the pixel electrode PX and the counter electrode CT. Further, the pixel electrode PX generates a holding capacitance Cst between the pixel electrode PX and an electrode not shown in the drawing to which a predetermined potential is applied by way of an insulation film not shown in the drawing.

As shown in FIG. 3, the respective scanning signal lines GL are connected with the drive circuit DRV by way of any one of scanning-signal-line lead lines GLP1, GLP2 which passes a picture frame region on a left side or a right side in the drawing. Further, the respective video signal lines DL are connected to the drive circuit DRV by way of video-signal-line lead lines DLP. On a lower side of the substrate SUB1, a terminal portion TM which is connected with a flexible printed circuit board not shown in the drawing is formed. A layout of wiring shown in FIG. 3 merely constitutes one example and can be suitably changed. The constitution of the drive circuit DRV and the number and positions of the drive circuits DRV can also be suitably changed when necessary.

Next, the structure which suppresses spreading of the orientation film in this embodiment is explained in conjunction with FIG. 1 and FIG. 2. As shown in FIG. 1, in a region (picture frame region) outside the display region AR of the substrate SUB1, the scanning-signal line lead lines GLP1 are formed. On the scanning-signal line lead lines GLP1, the scanning-signal line lead lines GLP2 are formed by way of the insulation film IN1. In this manner, by forming the scanning-signal line lead lines GLP1, GLP2 into the multi-layered structure by way of the insulation film IN1, the narrow picture frame can be acquired. The insulation film IN2 is formed on the scanning-signal line lead lines GLP2. A stopper layer ITO1 is formed on the insulation film IN2. An insulation film IN3 is formed on the stopper layer ITO1. A stopper layer ITO2 is formed on the insulation film IN3. On the insulation film IN3 and the stopper layer ITO2, the orientation film ORI1 is formed by coating at a position where the orientation film ORI1 is brought into contact with the liquid crystal LC. Thereafter, the sealing material SL is formed.

Here, the insulation film IN3 is, in a region inside the sealing material SL and outside the display region AR, formed into a plurality of projections PJ by etching. Due to such projections PJ, unevenness is formed on a surface of the insulation film IN3 and hence, spreading of the orientation film ORI1 can be suppressed.

Here, it is more preferable to form the scanning-signal-line lead lines GLP1, GLP2, the insulation films IN1, IN2, IN3 and the stopper layers ITO1, ITO2 simultaneously with a layer used for forming the pixels in a step for forming such a layer. This is because such simultaneous formation can prevent the increase of manufacturing steps. Due to such a constitution, the scanning-signal-line lead lines GLP1, GLP2, the insulation films IN1, IN2, IN3 and the stopper layers ITO1, ITO2 can be formed using the same material as a material used for forming the pixels and can also be formed on the same layer as the pixels.

For example, the explanation is made with respect to a case in which the insulation films IN1, IN2, IN3 are formed of a silicon nitride film which is used for forming the pixel regions PIX, and the stopper layers ITO1, ITO2 are formed of a transparent conductive film such as an ITO film used for forming the pixel regions PIX. In such a case, the insulation film IN3 can be formed into the projections PJ by dry etching using a mixed gas of sulfur hexafluoride gas ($SF_6$) and oxygen ($O_2$) as an etching gas, for example. In this case, since the insulation film IN2 arranged below the insulation film IN3 is also formed of a material which is etched using the same etching gas, to prevent such etching of the insulation film IN2, the stopper layer ITO1 which is formed of a material having etching selectivity for such an etching gas is arranged so as to protect the insulation film IN2 from the etching gas. Accordingly, it is possible to protect the insulation film IN2 and the scanning-signal-line lead lines GLP1, GLP2 and the insulation film IN1 which are arranged below the insulation film IN2 from the etching gas used for forming the projections PJ. Accordingly, the stopper layer ITO1 is formed in a region which overlaps a region where the projections PJ are formed.

Here, stopper layer ITO1 is formed of a conductive material and, at the same time, is formed such that the stopper layer ITO1 overlaps at least portions of the scanning-signal-line lead lines GLP1, GLP2 thus also acquiring an electrical shielding effect. In this case, it is desirable to apply a predetermined potential to the stopper layer ITO1.

Here, although the explanation is made with respect to the portions of the scanning-signal-line lead lines GLP1, GLP2 in FIG. 1, portions of the video-signal-line lead lines DLP may also adopt the substantially equal constitution. Further, it is desirable that the projections PJ are formed so as to surround four sides of the display region AR as shown in FIG. 2.

Next, a role of the stopper layer ITO2 formed at a position where the stopper layer ITO2 covers the projections PJ is explained. The stopper layer ITO2 is formed of a material having a contact angle with the orientation film ORI1 larger than a contact angle of the insulation film IN3 which constitutes the projections PJ with the orientation film ORI1. That is, the stopper layer ITO2 is formed of the material (for example, ITO) which exhibits wettability to the orientation film ORI1 lower than the wettability of the insulation film IN3 (for example, silicon nitride film). Due to such a constitution, the stopper layer ITO2 functions as a stopper for suppressing spreading of the orientation film ORI1 more effectively. Further, since the stopper layer ITO2 is formed to reflect the unevenness of the projections PJ, the stopper layer ITO2 can exhibit a high stopper effect compared to a stopper layer having a flat surface. It is desirable that the stopper layer ITO2 is formed of the same material as the pixel electrodes PX and is formed on the same layer as the pixel electrodes PX.

Further, the stopper layer ITO2 may also play a role of an etching stopper. For example, in the inside of the pixel region PIX, in forming a transparent conductive film made of ITO or the like on the insulation film IN3 as the pixel electrode PX not shown in the drawing, for example, it is possible to protect the stopper layer ITO1 from an oxalic acid used for patterning the transparent conductive film.

Heretofore, the explanation has been made with respect to the case in which the silicon nitride film is used for forming the insulation films IN1, IN2, IN3. However, the present invention is not limited to such a case, and a silicon oxide film may be adopted for partially or wholly forming the insulation films IN1, IN2, IN3. Alternatively, an inorganic insulation film or an organic insulation film may be adopted for partially or wholly forming these insulation films IN1, IN2, IN3. The stopper layers ITO1, ITO2 are not always formed of the transparent conductive film, and other conductive material, an insulation material or a semiconductor material may be adopted for forming the stopper layers ITO1, ITO2.

Embodiment 2

Figure 5:
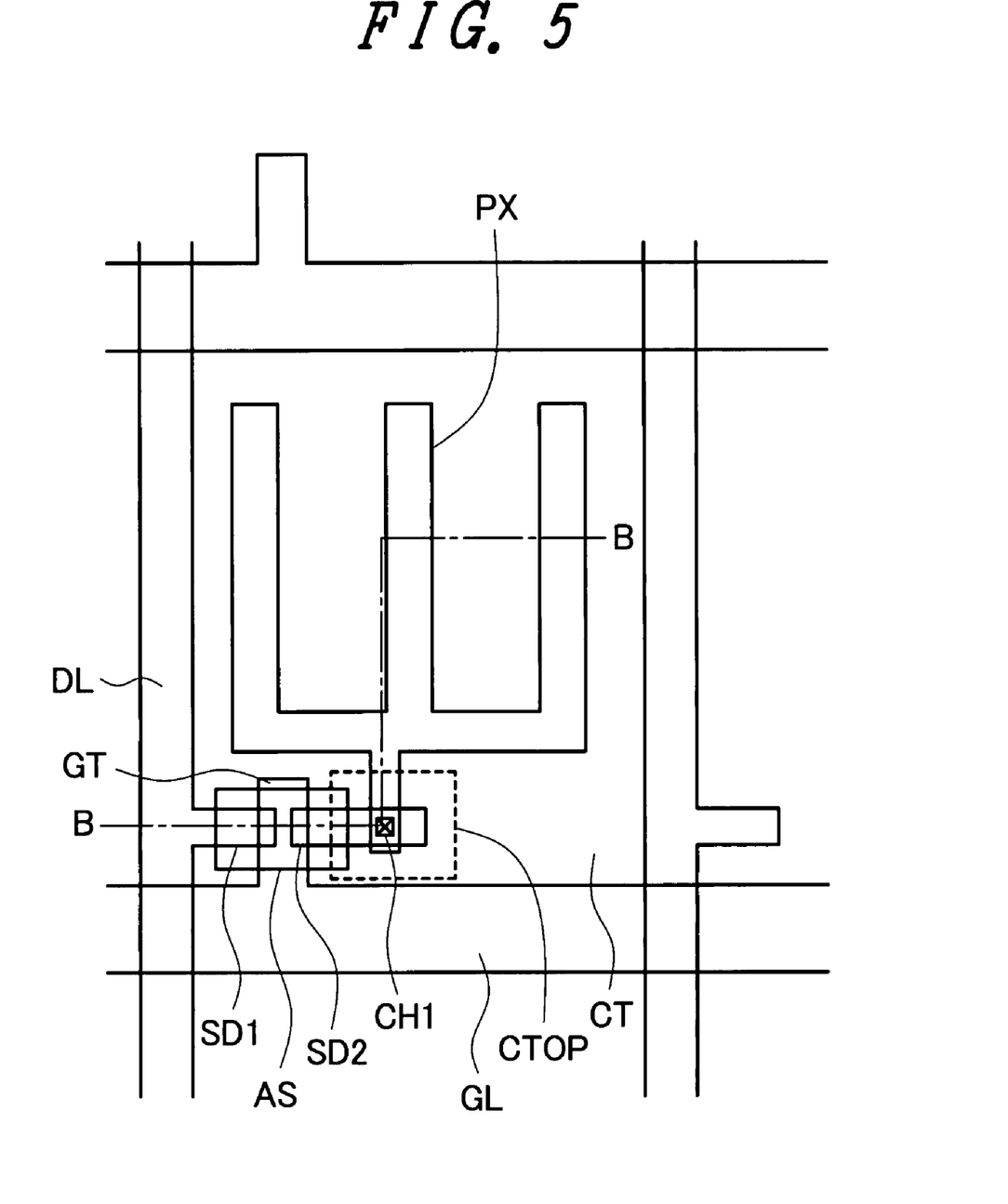
FIG. 5 is a plan view of one example of a pixel for explaining a liquid crystal display device of an embodiment 2 according to the present invention.
Figure 6:
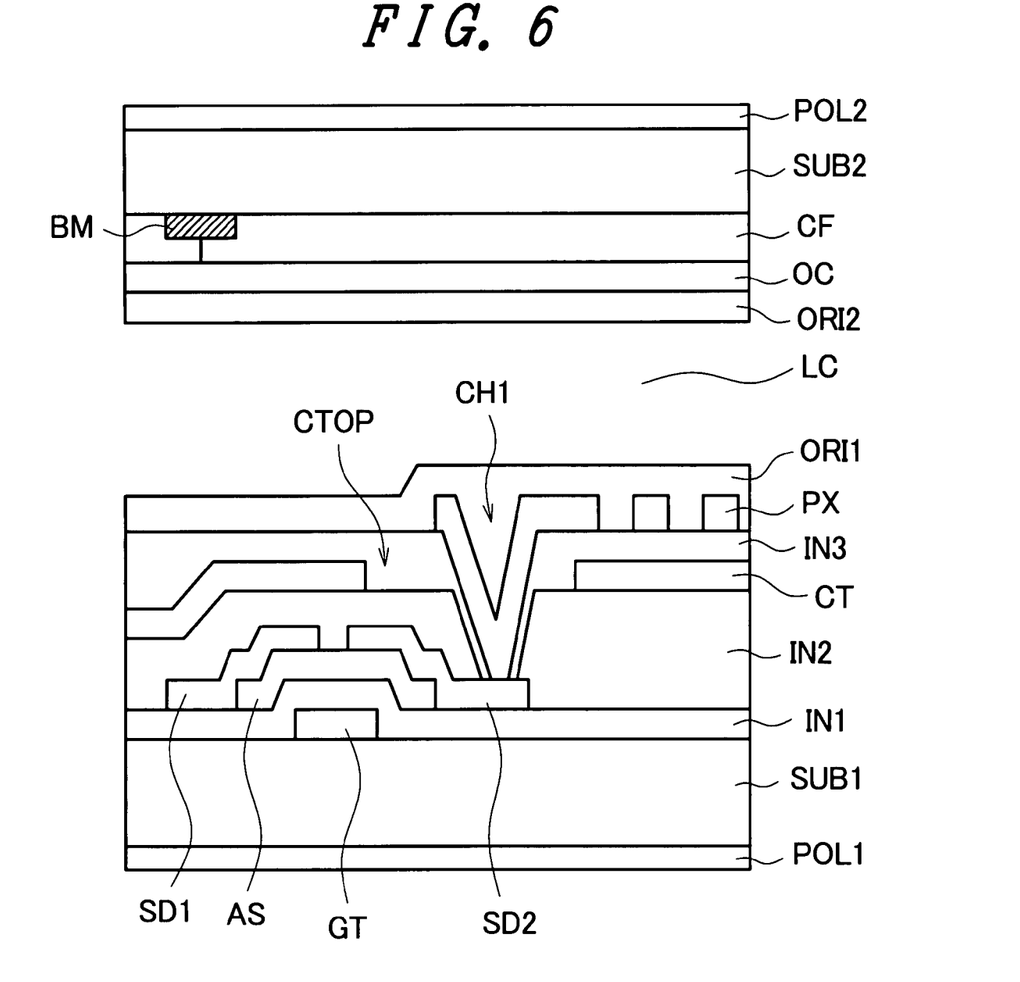
FIG. 6 is a cross-sectional view taken along a line B-B in FIG. 5.

Next, the present invention is explained in conjunction with a case in which the present invention is applied to an IPS-type liquid crystal display device. FIG. 5 is a plan view of one example of the pixel for explaining the liquid crystal display device of an embodiment 2 according to the present invention. FIG. 6 is a cross-sectional view taken along a line B-B in FIG. 5.

As shown in FIG. 5 and FIG. 6, portions of the scanning signal lines GL which are formed on the substrate SUB1 constitute the gate electrodes GT of the thin film transistors TFT. Here, the scanning-signal-line lead lines GLP1 explained in the embodiment 1 are also simultaneously formed. The insulation film IN1 explained in the embodiment 1 is formed on the scanning-signal-line lead lines GLP1 and functions as a gate insulation film. Semiconductor films AS made of amorphous silicon or the like, for example, are formed on the insulation film IN1. On the semiconductor films AS, the video signal lines DL, the drain electrodes SD1 and the source electrodes SD2 which are integrally formed with the video signal lines DL are formed. Here, the video-signal-line lead lines DLP and the scanning-signal-line lead lines GLP2 explained in the embodiment 1 are also simultaneously formed. Here, the scanning-signal-line lead lines GLP2 are connected with the scanning signal lines GL via contact holes not shown in the drawing.

Then, the insulation film IN2 explained in the embodiment 1 is formed on the video signal lines DL and the like, and the counter electrode CT is formed on the insulation film IN2. Here, the stopper layer ITO1 explained in the embodiment 1 can be also simultaneously formed. The counter electrode CT is formed in a planar shape, and opening portions CTOP are formed in the counter electrode CT in the vicinity of the contact holes CH1. At portions of the counter electrode CT except for the opening portions CTOP, the counter electrode CT overlaps the scanning signal lines GL and the video signal lines DL by way of an insulation film thus functioning also as an electrical shield. On the scanning signal lines GL and the video signal lines DL, the insulation film IN3 explained in the embodiment 1 is formed. The pixel electrodes PX are formed on the insulation film IN3. Here, the stopper layer ITO2 explained in the embodiment 1 can be also simultaneously formed. The pixel electrode PX is formed in a shape having linear portions (for example, a comb-teeth shape shown in FIG. 5) and overlaps the counter electrode CT by way of the insulation film IN3. The pixel electrode PX is connected to the source electrode SD2 via the contact hole CH1. The liquid crystal LC is driven by an electric field generated between the pixel electrode PX and the counter electrode CT. Further, a holding capacitance Cst is generated between the pixel electrode PX and the counter electrode CT by way of the insulation film IN3. Further, the orientation film ORI1 is formed on the pixel electrodes PX.

Further, on the counter substrate SUB2, a light blocking film BM, color filters CF, an over coat film OC and the orientation film ORI2 are formed. On a surface of the substrate SUB1 opposite to the liquid crystal, a polarizer POL1 is arranged. On a surface of the counter substrate SUB2 opposite to the liquid crystal, a polarizer POL2 is arranged.

Here, as explained in conjunction with the embodiment 1, the insulation films IN1, IN2, IN3 may be formed of the silicon nitride film, for example. However, a film for forming such insulation films is not limited to the silicon nitride film. Further, in the same manner as the embodiment 1, the pixel electrodes PX, the stopper layer ITO1, the counter electrode CT and the stopper layer ITO2 may be formed of the transparent conductive film such as an ITO film or the like. However, a film for forming these parts is not limited to such a transparent conductive film.

Embodiment 3

Figure 7:
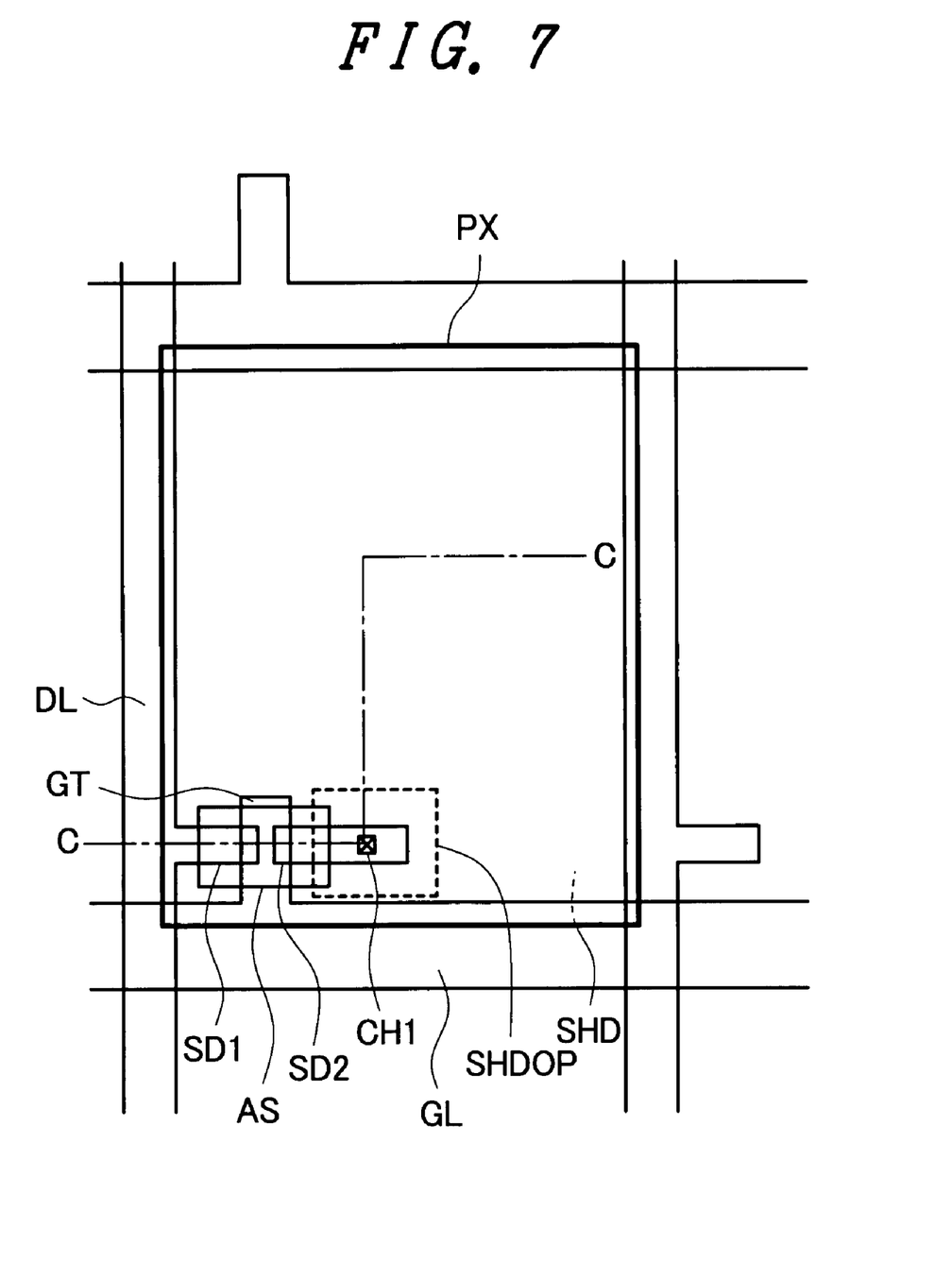
FIG. 7 is a plan view of one example of a pixel for explaining a liquid crystal display device of an embodiment 3 according to the present invention.
Figure 8:
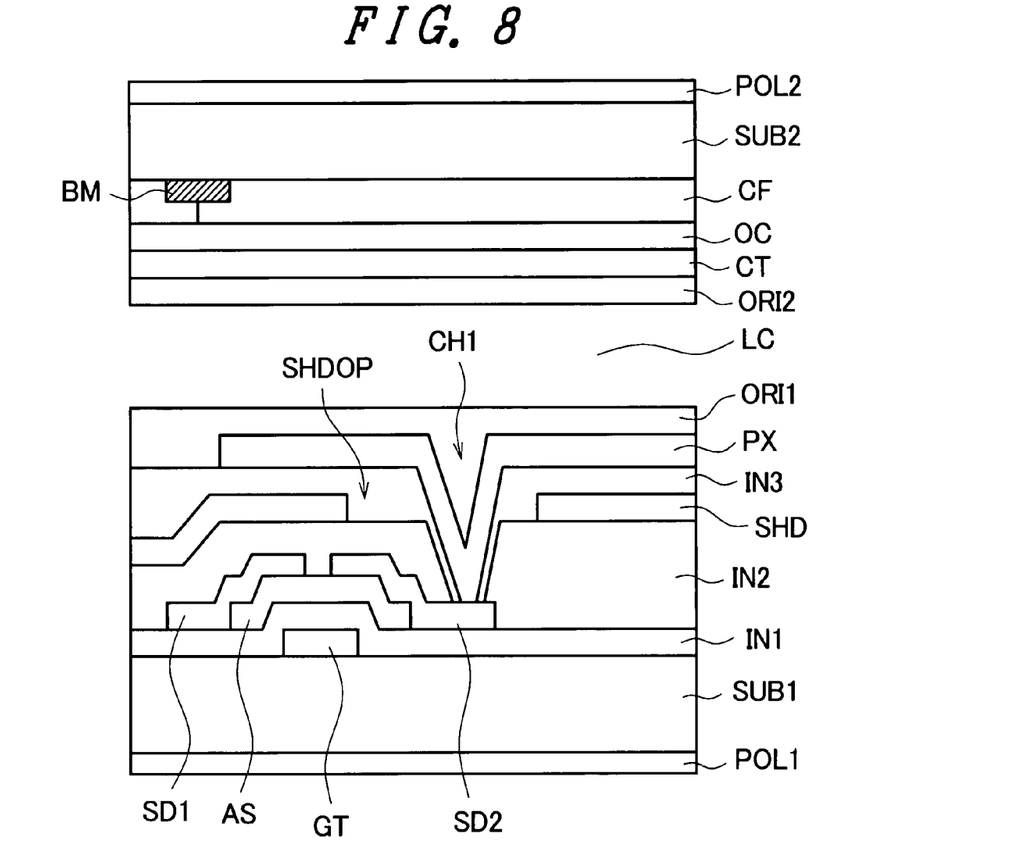
FIG. 8 is a cross-sectional view taken along a line C-C in FIG. 7.

Next, the present invention is explained in conjunction with a case in which the present invention is applied to a liquid crystal display device of a vertical electrical field type. FIG. 7 is a plan view of one example of the pixel for explaining the liquid crystal display device of an embodiment 3 according to the present invention. FIG. 8 is a cross-sectional view taken along a line C-C in FIG. 7. Here, in the embodiment 3, the explanation is made only with respect to the constitution which makes this embodiment differ from the embodiment 2, and the explanation of parts identical with the parts in the embodiments 1, 2 is omitted.

As shown in FIG. 7 and FIG. 8, in the embodiment 3, the counter electrode CT is formed on the counter-substrate-SUB2 side, for example, between the orientation film ORI2 and the overcoat film OC. Further, the pixel electrode PX is formed on the substantially whole area of the pixel region PIX in a planar shape. Further, the liquid crystal LC is driven by an electric field generated between the pixel electrodes PX formed on the substrate SUB1 and the counter electrode CT formed on the counter substrate SUB2.

Further, at portions where the counter electrode CT is formed in the embodiment 2, a shield electrode SHD is formed using a transparent conductive film made of ITO or the like, for example, in the embodiment 3. The shield electrode SHD may be simultaneously formed with a stopper layer ITO1. The shield electrode SHD is formed in a planar shape and opening portions SHDOP are formed in the shield electrode SHD in the vicinity of the contact holes CH1. At portions of the shield electrode SHD except for the opening portions SHDOP, the shield electrode SHD overlaps the scanning signal line GL and the video signal line DL by way of an insulation film thus functioning as an electric shield. Further, between the pixel electrodes PX and the shield electrode SHD, a holding capacitance Cst having a large area, that is, a large capacitance is formed by way of the insulation film IN3.

Embodiment 4

Figure 9:
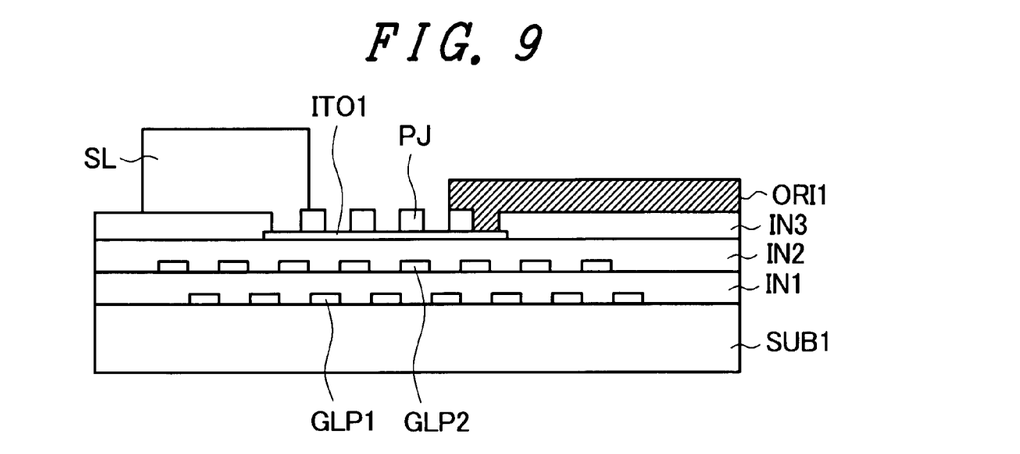
FIG. 9 is a view for explaining a liquid crystal display device of an embodiment 4 according to the present invention, and also is a cross-sectional view taken along a line A-A in FIG. 2.

Next, a modification of the embodiment 1 is explained. FIG. 9 is a view for explaining the liquid crystal display device of an embodiment 4 according to the present invention, and also is a cross-sectional view taken along a line A-A in FIG. 2.

The constitution which makes this embodiment differ from the embodiment explained in conjunction with FIG. 1 lies in that the modification omits the stopper layer ITO2 and constitutions other than such a constitution are substantially equal to the corresponding constitution of the embodiment 1.

When etching selection property is provided between the films (for example, pixel electrodes PX) formed on the stopper layer ITO1 and the stopper layer ITO1, it is unnecessary to provide the stopper layer ITO2 as an etching stopper for protecting the stopper layer ITO1. For example, also in using amorphous ITO at the time of forming the stopper layer ITO1, by applying heat treatment to the stopper layer ITO1 at a temperature of 230° C. before forming the pixel electrodes PX, it is possible to form the stopper layer ITO1 into a polycrystalline ITO layer. Accordingly, even when the stopper layer ITO1 is exposed at the time of etching the pixel electrodes PX which are formed of amorphous ITO using an oxalic acid, polycrystalline ITO is not etched by the oxalic acid and hence, the stopper layer ITO2 can be omitted.

Also in this case, the projection PJ can suppress spreading of the orientation film ORI1.

Embodiment 5

Figure 10:
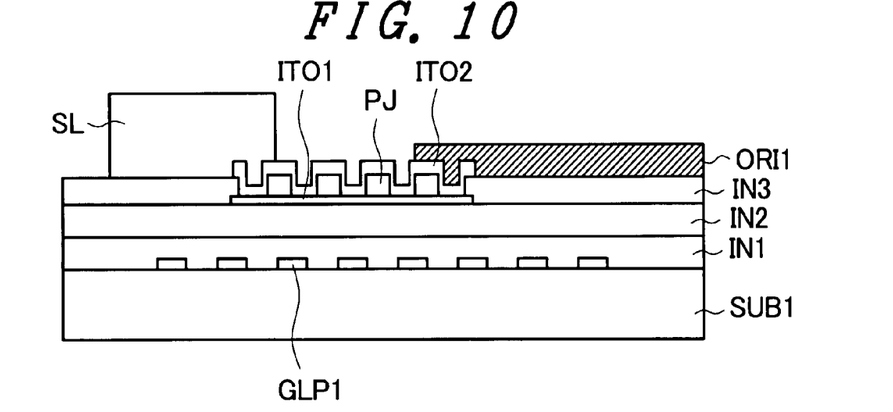
FIG. 10 is a view for explaining a liquid crystal display device of an embodiment 5 according to the present invention, and also is a cross-sectional view taken along a line A-A in FIG. 2.

Next, another modification of the embodiment 1 is explained. FIG. 10 is a view for explaining the liquid crystal display device of an embodiment 5 according to the present invention, and also is a cross-sectional view taken along a line A-A in FIG. 2.

The constitution which makes this embodiment differ from the embodiment explained in conjunction with FIG. 1 lies in that the scanning-signal-line lead lines GLP2 are omitted and constitutions other than such a constitution are substantially equal to the corresponding constitution of the embodiment 1.

Embodiment 6

Next, in the embodiment 6, a planar shape of the projections PJ which is applicable to the embodiments 1 to 5 is explained.

Figure 11:
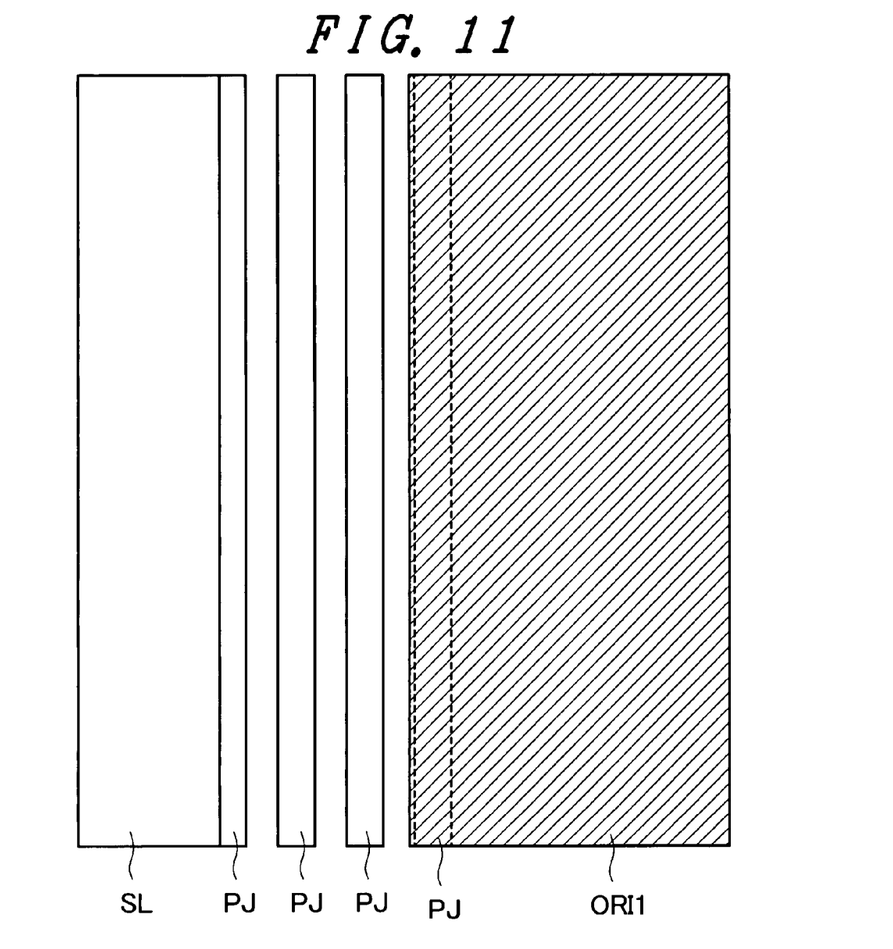
FIG. 11 is a plan view for explaining one example of a liquid crystal display device of an embodiment 6 according to the present invention.

FIG. 11 is a plan view for explaining one example of the liquid crystal display device of an embodiment 6 according to the present invention. In FIG. 11, the projections PJ are respectively formed in a continuously linear shape.

Figure 12:
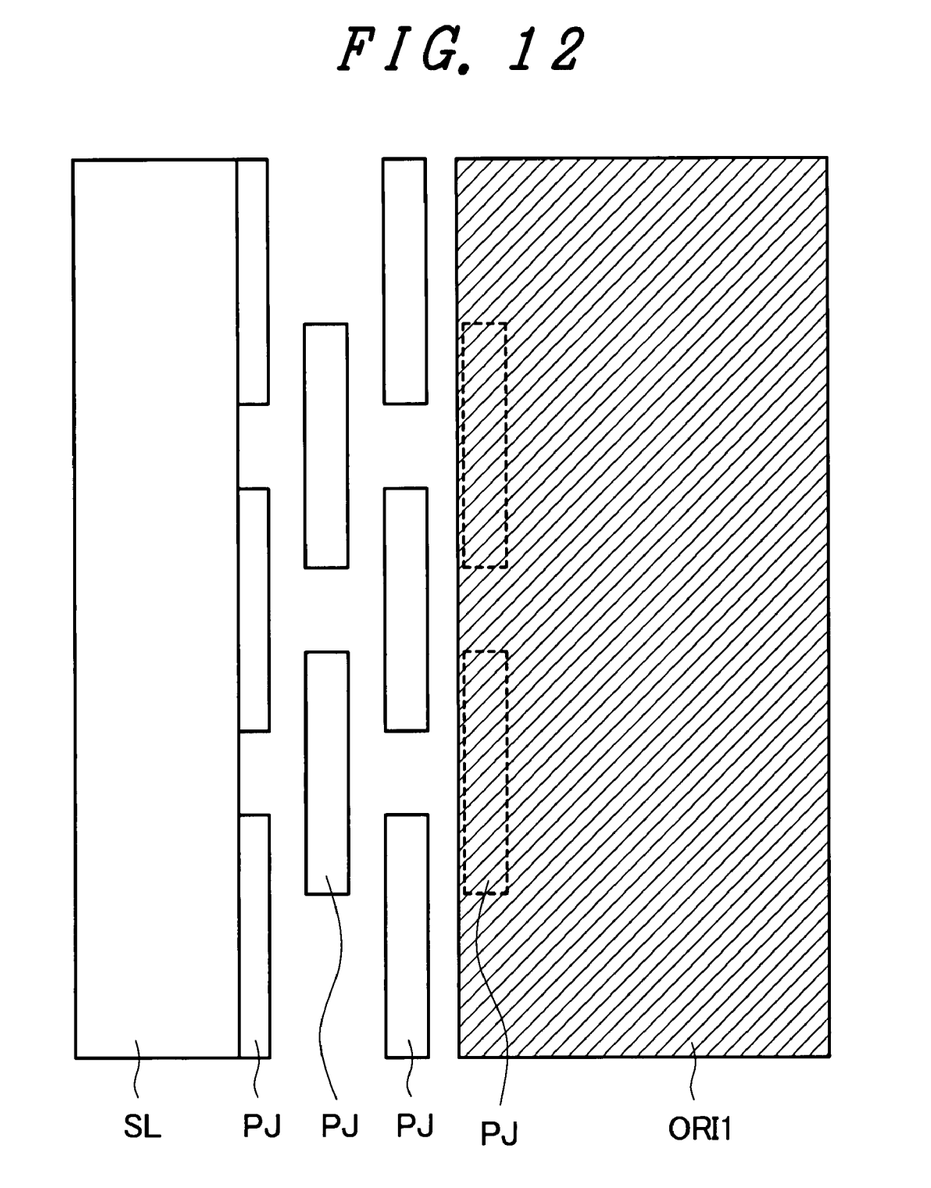
FIG. 12 is a plan view for explaining another example of the liquid crystal display device of the embodiment 6 according to the present invention.

FIG. 12 is a plan view for explaining another example of the liquid crystal display device of the embodiment 6 according to the present invention. In FIG. 12, the projections PJ are respectively formed in an interrupted linear shape. Further, in a row constituted of a plurality of projections PJ, by forming cut portions in a staggered manner, spreading of the orientation film ORI1 can be suppressed.

Here, the planar shape of the projections PJ according to the present invention is not limited to examples shown in FIG. 11 and FIG. 12, and the projection PJ may be formed in other shapes.

Embodiment 7

Figure 13:
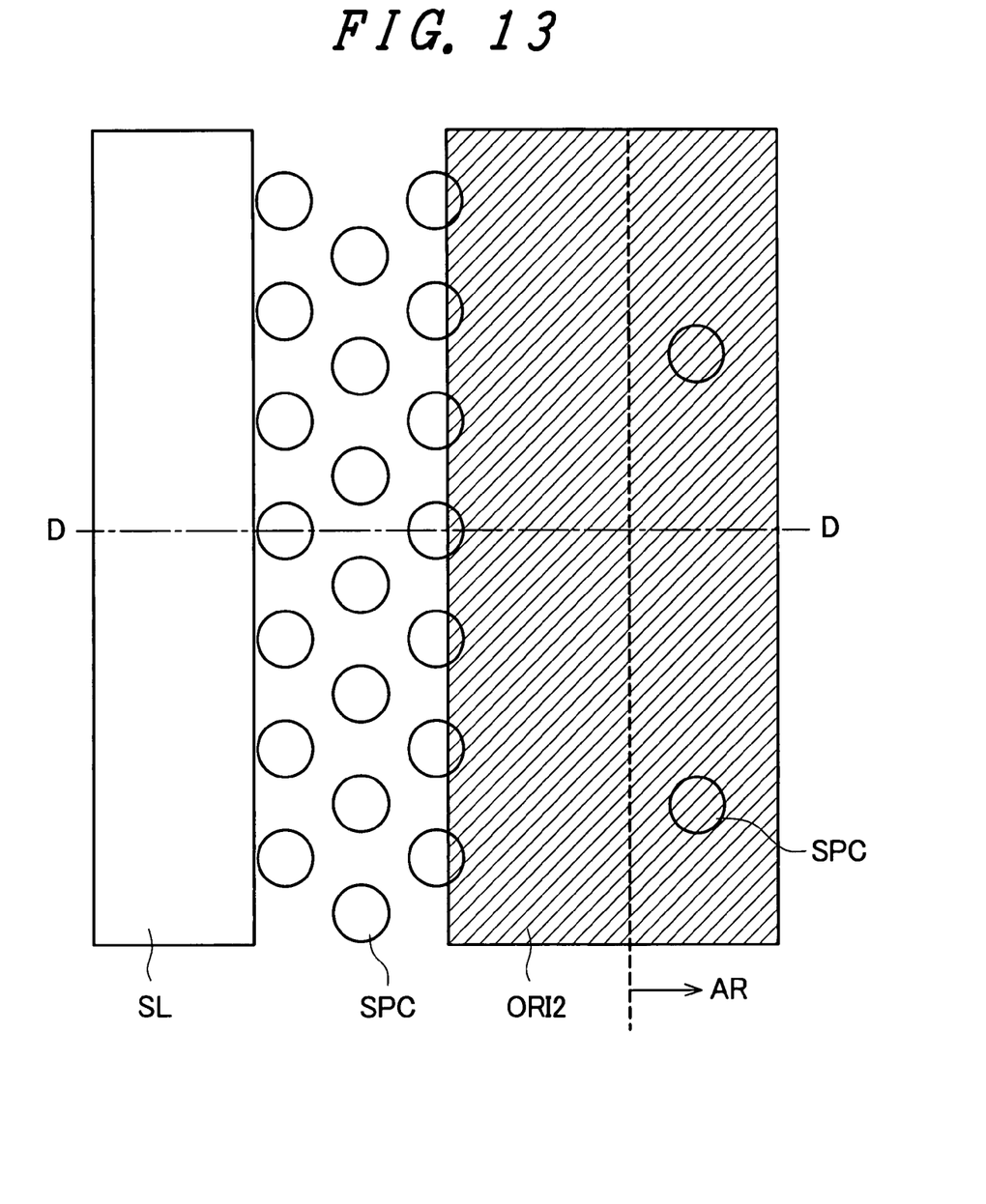
FIG. 13 is a plan view for explaining a liquid crystal display device of an embodiment 7 according to the present invention.
Figure 14:
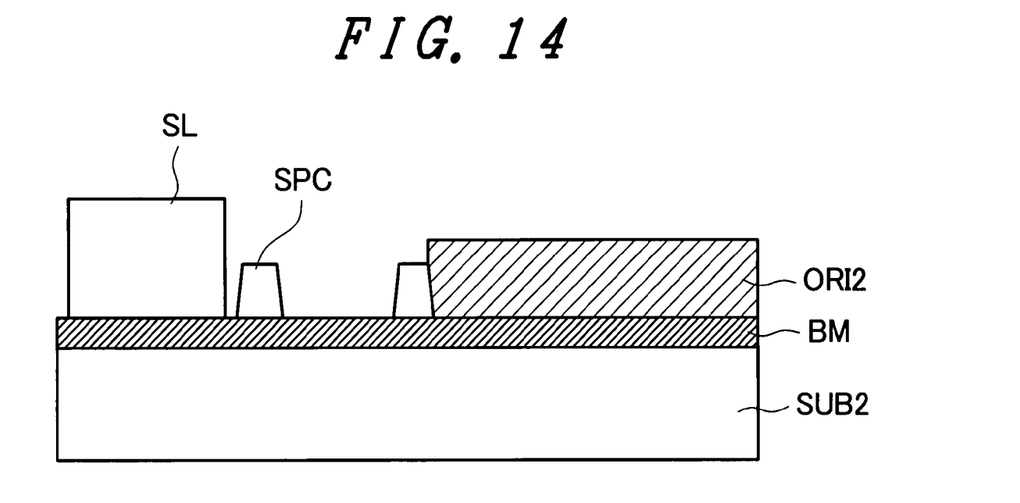
FIG. 14 is a cross-sectional view taken along a line D-D in FIG. 13.

Next, the explanation is made with respect to the structure which suppresses spreading of the orientation film ORI2 on the counter-substrate-SUB2 side. FIG. 13 is a plan view for explaining the liquid crystal display device of an embodiment 7 according to the present invention. FIG. 14 is a cross-sectional view taken along a line D-D in FIG. 13.

On the counter-substrate-SUB2 side, by forming parts (columnar spacers SPC in FIG. 13) substantially equal to or similar to columnar spacers SPC formed in the display region AR in a region inside the sealing material SL and outside the display region AR, it is possible to suppress spreading of the orientation film ORI2. In this case, it is desirable to form such columnar spacers SPC with density higher than density of the columnar spacers SPC in the display region AR. For example, the columnar spacers SPC are formed in the display region AR with the density of 5 to 150 pieces of columnar spacers SPC per 1 $mm^2$, while the columnar spacers SPC are formed in the picture frame region with the density of 200 or more pieces of columnar spacers SPC per 1 $mm^2$.

Further, with respect to the columnar spacers SPC in the picture frame region, it is desirable to arrange the columnar spacers SPC in a plurality of rows as well as in a staggered manner as shown in FIG. 13 for suppressing spreading of the orientation film ORI2. Here, the columnar spacers SPC in the picture frame region may be formed in a shape which differs from a shape of the columnar spacers SPC in the display region AR. For example, the columnar spacers SPC in the picture frame region may be formed in a continuously linear shape, an interrupted linear shape or other shape, for example.

Embodiment 8

Figure 15:
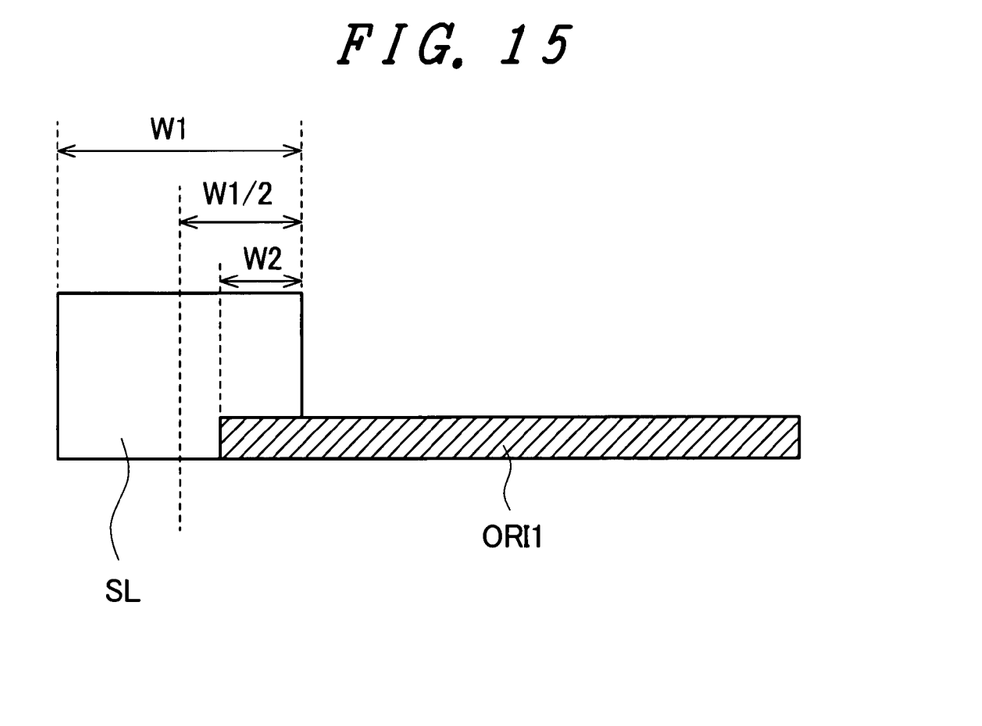
FIG. 15 is a cross-sectional view for explaining a liquid crystal display device of an embodiment 8 according to the present invention.

Next, the explanation is made with respect to a case in which the sealing material SL and the orientation film ORI1 overlap each other. FIG. 15 is a cross-sectional view for explaining the liquid crystal display device of an embodiment 8 according to the present invention. As in the case of the respective embodiments explained heretofore, it is desirable that the orientation film ORI1 does not overlap the sealing material SL. However, as shown in FIG. 15, assuming a width of the sealing material SL as W1 and a width at which the orientation film ORI1 and the sealing material SL overlap each other as W2, provided that a relationship of W2≦W1/2 is satisfied, an adhesion strength of the sealing material SL can be ensured to some extent and hence, the overlapping is allowable within a range that such a condition is satisfied. Here, although the explanation has been made with respect to the orientation film ORI1, the same goes for the orientation film OR2.

Although the present invention has been explained in conjunction with the embodiments heretofore, the constitutions explained in the respective embodiments heretofore constitute merely one example, and various modifications can be properly made without departing from the technical concept of the present invention. For example, when the thin film transistor TFT is formed using polycrystalline silicon, the thin film transistor TFT may adopt the top gate structure, or a background film may be formed between the substrate and the semiconductor film. For example, when the present invention is applied to a reflective or transflective liquid crystal display device, a portion of the film may be replaced with a reflection film or a reflection film may be additionally provided. Besides the above-mentioned constitutions, various modifications are conceivable. Further, the constitutions explained in conjunction with the respective embodiments may be used in combination provided that these embodiments do not contradict each other.

What is claimed is:

1. A liquid crystal display device comprising:
a first substrate;
a second substrate which is arranged to face the first substrate in an opposed manner;
a sealing material which adheres the first substrate and the second substrate to each other; and
liquid crystal which is sandwiched between the first substrate and the second substrate; wherein
the first substrate includes:
pixel electrodes which are formed inside a display region;
an orientation film which is formed at a position where the orientation film is brought into contact with the liquid crystal;
a plurality of projections which is formed of a first insulation film below the orientation film in a region inside the sealing material and outside the display region;
a second insulation film which is arranged at a position where the second insulation film overlaps the plurality of projections and below the first insulation film, and is formed of a material to be etched by an etching gas which forms the first insulation film into the plurality of projections; and
a first stopper layer which is formed at a position where the first stopper layer overlaps the plurality of projections and between the first insulation film and the second insulation film, the first stopper layer being formed of a material which possesses etching selection property for the etching gas and protecting the second insulation film from the etching gas, and
assuming a width of the sealing material as W1 and an overlapping width of the orientation film and the sealing material as W2, a relationship W2≦W1/2 is established.

2. A liquid crystal display device according to claim 1, wherein a shortest distance from an end portion of the first substrate to the display region is 2.0 mm or less.

3. A liquid crystal display device according to claim 1, wherein the overlapping width W2 of the orientation film and the sealing material is set to W2=0.

4. A liquid crystal display device according to claim 1, wherein the first substrate includes lines which are arranged inside the display region, and lead lines which are arranged outside the display region and supply signals to the lines, and
the lead lines are arranged below the second insulation film and overlap the first stopper layer.

5. A liquid crystal display device according to claim 4, wherein the first stopper layer is formed of a conductive film.

6. A liquid crystal display device according to claim 1, wherein the first substrate reflects a surface unevenness formed by the plurality of projections, and includes a second stopper layer which is formed at a position where the second stopper layer covers the plurality of projections and is formed of a material having a contact angle with the orientation film larger than a contact angle of the first insulation film with the orientation film.

7. A liquid crystal display device according to claim 6, wherein the second stopper layer is formed of the same material as the pixel electrodes, and is formed on the same layer as the pixel electrodes.

8. A liquid crystal display device according to claim 1, wherein the first substrate includes a counter electrode which is formed of a transparent conductive film inside the display region, and the liquid crystal is driven by an electric field which is generated between the pixel electrodes and the counter electrode.

9. A liquid crystal display device according to claim 8, wherein the first stopper layer is formed of the same material as the counter electrode, and is formed on the same layer as the counter electrode.

10. A liquid crystal display device according to claim 1, wherein the second substrate includes a counter electrode which is formed of a transparent conductive film inside the display region, and the liquid crystal is driven by an electric field which is generated between the pixel electrodes and the counter electrode.

11. A liquid crystal display device according to claim 10, wherein the first substrate includes an electrode which is formed of a transparent conductive film and is arranged below the pixel electrodes and at a position where the electrode overlaps the pixel electrodes, and a holding capacitance is formed between the electrode formed of the transparent conductive film and the pixel electrodes.

12. A liquid crystal display device according to claim 11, wherein the first stopper layer is formed of the same material as the electrode formed of the transparent conductive film and is formed on the same layer as the electrode formed of the transparent conductive film.

13. A liquid crystal display device according to claim 1, wherein the first insulation film and the second insulation film are formed of an inorganic insulation film.

14. A liquid crystal display device according to claim 1, wherein the first insulation film and the second insulation film are formed of a silicon nitride film.

15. A liquid crystal display device according to claim 1, wherein the first stopper layer is formed of a transparent conductive film.

16. A liquid crystal display device according to claim 1, wherein the plurality of projections is formed in a state that the projections surround four sides of the display region.

* * * * *